(12) United States Patent
Brown et al.

(10) Patent No.: US 6,950,832 B2
(45) Date of Patent: Sep. 27, 2005

(54) METHOD FOR DYNAMICALLY ALLOCATING A DEVICE IN AN LPAR SYSTEM

(75) Inventors: Joe N. Brown, Austin, TX (US); Faisal M. Awada, Round Rock, TX (US); Philip B. Burkes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 09/918,811

(22) Filed: Jul. 31, 2001

(65) Prior Publication Data

US 2003/0028523 A1 Feb. 6, 2003

(51) Int. Cl.[7] ............................................... G06F 17/30
(52) U.S. Cl. .............................. 707/200; 707/3; 714/6
(58) Field of Search .................... 707/1–10, 100–104.1, 707/200–206; 711/129, 153, 173; 714/6, 48, 52, 57, 701, 723, 753, 765, 768, 56

(56) References Cited

U.S. PATENT DOCUMENTS

| | | | | |
|---|---|---|---|---|
| 5,659,756 A | * | 8/1997 | Hefferon et al. | ............ 710/200 |
| 5,832,508 A | * | 11/1998 | Sherman et al. | ............ 707/200 |
| 6,014,669 A | * | 1/2000 | Slaughter et al. | ............. 707/10 |
| 6,138,112 A | * | 10/2000 | Slutz | .............................. 707/2 |
| 6,687,698 B1 | * | 2/2004 | Nixon et al. | .................. 707/10 |
| 6,701,464 B2 | * | 3/2004 | Austen et al. | ................ 714/48 |
| 6,704,737 B1 | * | 3/2004 | Nixon et al. | ................ 707/101 |

OTHER PUBLICATIONS

IBM, Rios Diagnostics Open Architecture—Dec. 1990.*
IBM, Recovery from Single Critical Hardware Resource Unavailability—Aug. 1993.*

* cited by examiner

Primary Examiner—Shahid Alam
Assistant Examiner—Jean Bolte Fleurantin
(74) Attorney, Agent, or Firm—Richard F. Frankeny; Winstead Sechrest & Minick P.C.; Herman Rodriguez

(57) ABSTRACT

When resources are reported missing within a system they are logged in a system error log. Specifically, resources that are missing because they have been reassigned from one logical partition (LPAR) within the system to another LPAR are tagged. When diagnostics are run to resolve missing resources, the resource reconfiguration database is queried for all resources that were assigned to LPARs and now are reported as missing and a missing resource List is created. The system error log is searched for resources that are tagged as missing because of reassignment. Any tagged resource and associated child resources of the tagged resource are removed from the missing resource List thereby updating the List. Normal missing resource resolution procedures are run against the updated missing resource List.

31 Claims, 2 Drawing Sheets

METHOD FOR DYNAMICALLY ALLOCATING A DEVICE IN AN LPAR SYSTEM

TECHNICAL FIELD

The present invention relates in general to mainframe computer systems and in particular to mainframe computer systems that are configured to run multiple operating systems.

BACKGROUND INFORMATION

A mainframe computer system may be configured to run multiple operating systems. A logical segmentation of a mainframe's memory and other resources that allow the logical segmentation to run its own copy of an operating system and associated applications is called a Logical Partition (LPAR). LPARs are created by special hardware circuits and allow multiple system images to run in one machine. This may be multiple instances of the same operating system or different operating systems. With respect to systems designed by International Business Machines Corporation ("IBM"), this is known as a "virtualized System/390 processor complex." LPARs are implemented in hardware extensions. IBM's PR/SM ("prism"), Hitachi's MLPF and Amdahl's MDF are examples of LPARs. MDF was the first to provide hardware that was the equivalent of IBM's virtual machine (VM) operating system, which supports multiple system images in software. Interestingly enough, an LPAR can host VM, which itself can host multiple operating systems.

In a dynamic LPAR system, a device currently assigned to an LPAR 'A' may be dynamically reassigned to another LPAR 'B'. When this happens, the resource configuration database (Object Data Manager for that LPAR) will indicate that the device is missing from LPAR 'A'. There is considerable system overhead associated with removing a previously assigned resource from the LPAR as opposed to just indicating that it is missing. Also, the resource may later be again reassigned back to the LPAR to which it was originally assigned and considerable overhead would again be expended in recreating objects for the resource. If the resource has "children" attached, those children will also be listed as missing. For example, if the resource is an asynchronous adapter (parent) the adapter also has a number of ports (children) that also have to be listed as missing if the parent is listed as missing.

While indicating that a previously assigned resource is missing if it is reassigned is a simple way to handle this problem, the Advanced Interactive Executive (AIX) diagnostic subsystem normally treats a resource that is missing as potentially being caused by a hardware problem which would result in an unnecessary service call in the instance of a reassigned resource. AIX is IBM Corporation's version of the UNIX operating system.

There is, therefore, a need for a method for managing dynamically reassignment of LPARs to prevent unneeded service calls without having to change the architecture of missing resource resolution or incurring high system overhead by removing the resource if it is reassigned.

SUMMARY OF THE INVENTION

Resources that are reassigned in a logical partition (LPAR) of a mainframe computer are tagged in a system error log as missing because of reassignment. When diagnostics are run to resolve resources that were assigned to an LPAR but are now missing, the resource reconfiguration database for the LPAR is searched for resources that were assigned to the LPAR but are now listed as missing, and a missing resource List is created. The entries in the system error log are searched for resources tagged as missing because of reassignment. Any resource, which appears in the missing resource and has been tagged in the system error log as missing, is deleted thereby updating the missing resource LIST. Also, any "child" resources associated with the tagged resources are also removed from the missing resource list. Normal missing resource resolution procedures are then run on the updated resource LIST.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
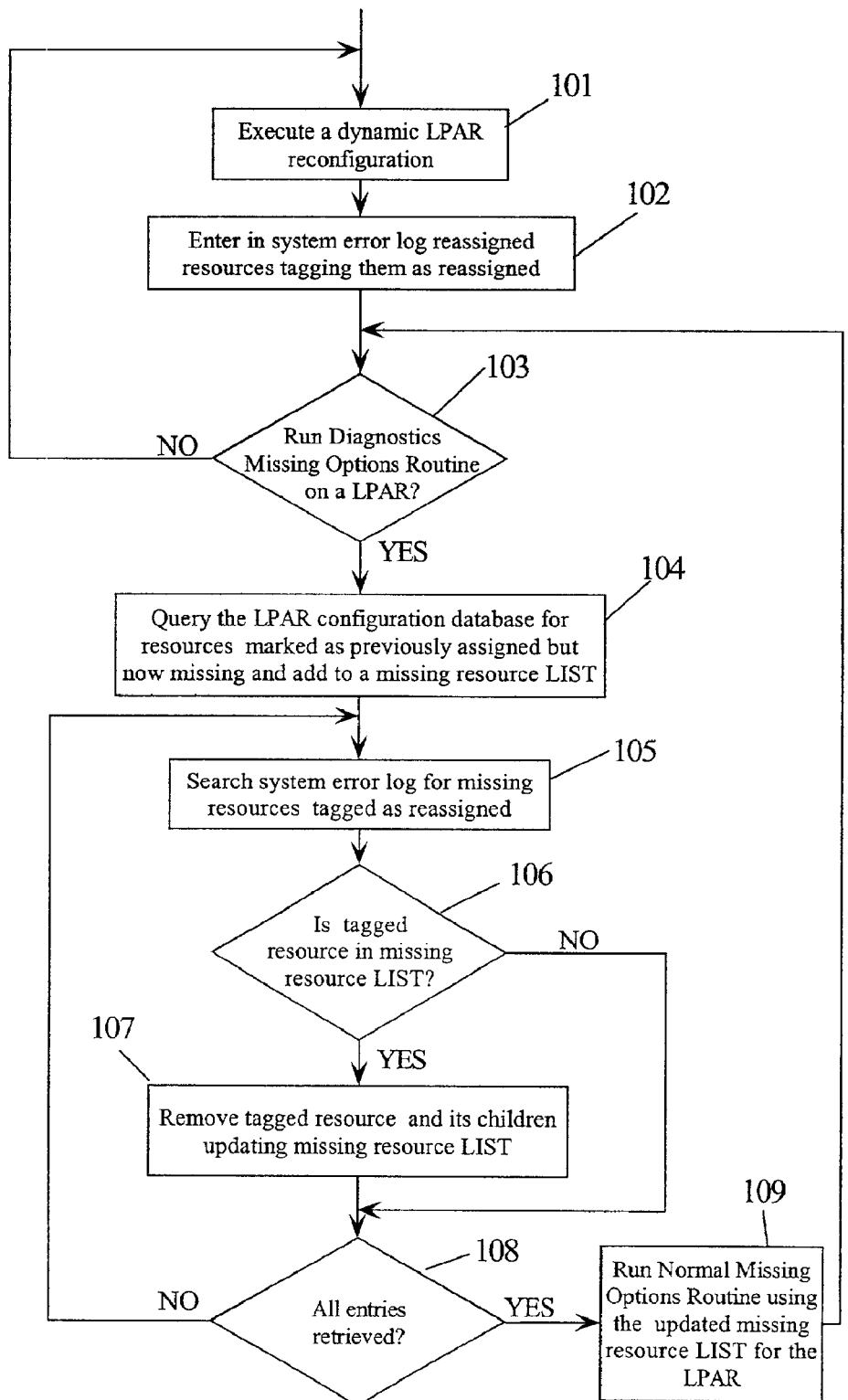
FIG. 1 is a flow diagram of method steps according to embodiments of the present invention.

In the following description, numerous specific details are set forth to provide a thorough understanding of the present invention. However, it will be obvious to those skilled in the art that the present invention maybe practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

In the following detailed descriptions a resource is one element of hardware, software or data that is part of a larger system. For example, network resources are the available servers and printers in the network. Software resources may be programs, utilities or even smaller elements within a program. Data resources are the files and databases that may be accessed.

In present Advanced Interactive Executive (AIX) systems, resources that are determined to be missing are entered into the system error log as "just missing" without any reason. Embodiments of the present invention tag resources that are dynamically removed from an LPAR because of reassignment such that these "missing" resources may be identified. Whenever an LPAR is set up and resources are assigned to the LPAR, its resource configuration database (RCD) has a feature that indicates which resources are assigned to the LPAR. A user may use a Hardware System Console (HSC) to initiate software processes that reconfigure resources by removing them from one LPAR and adding them to another LPAR. Embodiments of the present invention modify these software processes so that the routine that removes a resource also tags it in the system error log so it is identified as missing from the LPAR because of reassignment. If a resource is removed from an LPAR, a state indicator in the RCD for the LPAR will be changed to indicate that a previously assigned resource is no longer assigned. Likewise, if a resource does not respond within an LPAR it may have its state indicator changed to indicate that it is missing. If a resource does not respond, then an error condition usually exists. Diagnostic routines may be run to determine what recovery action to take. As part of the diagnostic routines a Missing Resource Options (MRO) routine may be run to resolve missing resources. A Missing Resource Options routine may also be run as part of a system boot-up. In this case, the RCDs of the various LPARs within the system would be searched to determine if the resources that were assigned to each LPAR has the appropriate state indicator. This is done to determine if the system and its LPARs are in the same configuration state as it was before system reboot. If a resource was dynamically reassigned or is no longer responding, then the state indicator in the RCD would have the same indication (indicating the resource is missing). Without embodiments of the present invention, the MRO routine creates a missing resource List that includes all missing resources for the LPAR on which the diagnostic routines are run. This may result in a service call to resolve which resources are missing because of a failure or which are just missing because of a dynamic reassignment with LPARs. However, embodiments of the present invention identify those resources in the system error log that are missing because of reassignment with a tag. The resources that have been tagged because of reassignment in the system error log may be compared to the missing resource List for the LPAR and these resources and any associated resources (child resources) are removed from the missing resource LIST. This updated missing resource List now no longer contains resources which are indicated as missing because of reassignment during dynamic resource reassignment.

FIG. 1 is a flow diagram of method steps according to embodiments of the present invention. In step 101, a dynamic reconfiguration of a logical partition (LPAR) within a system (see system in FIG. 2) is to be executed. In step 102 any reassigned resources that are removed from the LPAR are logged in a system error log and tagged as missing from the LPAR because of reassignment. The software processes that remove a resource from the LPAR are modified in embodiments of the present invention to also tag the resource as missing because of reassignment in the system error log. In step 103, a test is done to determine if a diagnostic Missing Options Routine is to be run to resolve missing resources. Diagnostics may be run as part of a system boot-up or as the result of a user action. Resolving missing resources determines the cause of missing resources and determines whether a service call is necessary since missing resources usually indicate a hardware failure. If the result of the test in step 103 is NO, then a return is taken to step 101. If the result of the test in step 103 is YES, then the system diagnostic software is being executed and Missing Resource Options routines are run to resolve missing resources. In step 104, the configuration database for the LPAR being checked is queried for resources marked as previously assigned to the LPAR but now missing, and the missing resources are added to a missing resource List. In step 105, the system error log is searched for missing resources that have been tagged as missing because of reassignment. In step 106, a test is done to determine if a missing resource tagged as reassigned appears in the missing resource List of the LPAR being checked. If the result of the test in step 106 is YES, the tagged missing resource and any associated "child" resources of the tagged missing resource are removed from the missing resource List in step 107. In step 108 a test is done to determine if all entries in the missing resource List has been compared to tagged missing resources in the system error log. If the result of the test in step 108 is NO, then a branch is taken back to step 105 where searching the system error log is continued. If the result of the test in step 108 is YES, then in step 109 normal missing resource resolution procedures are run against the updated missing resource List for the LPAR then a branch is taken back to step 103 to determine if the Missing Options routine is run for another LPAR.

Figure 2:
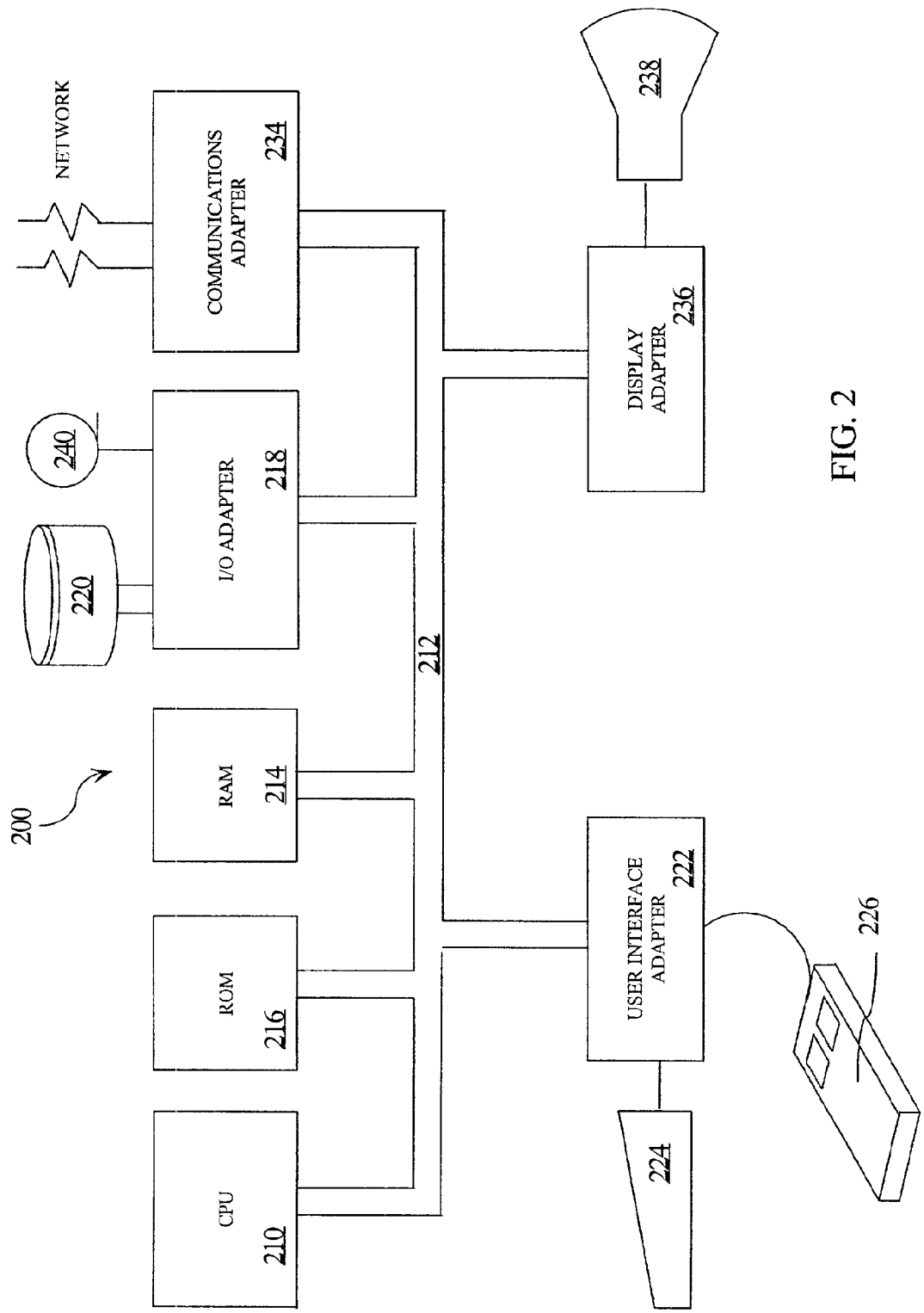
FIG. 2 is a system block diagram of a mainframe computer system configured to use embodiments of the present invention.

FIG. 2 is a high level functional block diagram of a representative data processing system 200 suitable for practicing principles of the present invention. Data processing system 200, includes a central processing system (CPU) 210 operating in conjunction with a system bus 212. System bus 212 operates in accordance with a standard bus protocol compatible with CPU 210. CPU 210 operates a read-only memory (ROM) 216 and a random access memory (RAM) 214. Among other things, ROM 216 supports the Basic Input Output System (BIOS). RAM 214 includes DRAM (Dynamic Random Access Memory) system memory and SRAM (Static Random Access Memory) external cache. I/O Adapter 218 allows for an interconnection between the devices (resources) on system bus 212 and external peripherals, such as mass storage devices (e.g., a hard drive 220, floppy drive or CD-ROM drive), or a printer 240. A peripheral device 220 is coupled to a peripheral control interface (PCI) bus and therefore I/O adapter 218 may be a PCI bus bridge. User interface adapter 222 couples various user input devices, such as a keyboard 224, or mouse 226 to the processing devices on bus 212. Display 239 may be, for example, a cathode ray tube (CRT), liquid crystal display (LCD) or similar conventional display units. Display adapter 236 may include, among other things, a conventional display controller and frame buffer memory. Data processing system 200 maybe selectively coupled to another computer or communications network 241 through communications adapter 234. Communications adapter 234 may include, for example, a modem for connection to a telecom network and/or hardware and software for connecting to a computer network such as a local area network (LAN) or a wide area network (WAN). CPU 210 may be a processor system which executes a program product that resolves missing resources that are missing because of dynamic reassignment according to embodiments of the present invention. Various memory in system 100 may be configured to host logical partitions (LPAR) operable to run application programs in conjunction with allocated resources.

Implementations of the invention include implementations as a computer system programmed to execute the method or methods described herein, and as a computer program product. According to the computer system implementation, sets of instructions for executing the method or methods described in FIG. 1 may reside in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change maybe electrical, magnetic, chemical, biological, or some other physical change. While it is convenient to describe the invention in terms of instructions, symbols, characters, or the like, the reader should remember that all of these and similar terms should be associated with the appropriate physical elements.

Although the present invention and its advantages have been described in detail, it should be understood that various changes, substitutions and alterations can be made herein without departing from the spirit and scope of the invention as defined by the appended claims.

What is claimed is:

1. A method for managing dynamic resource reassignment within a system comprising the steps of:

tagging first missing resources in a system error log which are missing because of reassignment;

querying a configuration database in said system for resources identified as missing resources and adding said missing resources to a missing resource List as second missing resources;

updating said missing resource List by deleting any of said tagged first missing resources which are included in said missing resource List as second missing resources; and executing a missing resource options procedure on missing resources in said updated missing resource List.

2. The method of claim 1, wherein said dynamic resource reassignment occurs between logical partitions (LPARs) of said system.

3. The method of claim 2, wherein said missing resources are tagged in response to reassignment from a first one of said LPARs of said system to a second one of said LPARs of said system.

4. The method of claim 1, wherein said configuration database is a configuration database for a logical partition (LPAR) within said system.

5. A computer program product for managing dynamic resource reassignment within a system, said computer program product embodied in a machine readable medium, including programming for a processor, said computer program comprising a program of instructions for performing the program steps of:

tagging first missing resources in a system error log which are missing because of reassignment;

querying a configuration database in said system for resources identified as missing resources and adding said missing resources to a missing resource List as second missing resources;

updating said missing resource List by deleting any of said tagged first missing resources which are included in said missing resource List as second missing resources; and executing a missing resource options procedure on missing resources in said updated missing resource List.

6. The computer program product of claim 5, wherein said dynamic resource reassignment occurs between logical partitions (LPARs) of said system.

7. The computer program product of claim 6, wherein said missing resources are tagged in response to reassignment from a first one of said LPARs of said system to a second one of said LPARs of said system.

8. The computer program product of claim 5, wherein said configuration database is a configuration database for a logical partition (LPAR) within said system.

9. A computer system comprising:

a central processing unit (CPU);

a random access memory (RAM);

a read only memory (ROM);

an I/O adapter; and a bus system coupling said CPUs to said ROM, said I/O adapter, and said RAM, wherein a sub-system within said computer system further comprises:

circuitry for tagging first missing resources in a system error log which are missing because of reassignment;

circuitry for querying a configuration database in said system for resources identified as missing resources and adding said missing resources to a missing resource List as second missing resources;

circuitry for updating said missing resource List by deleting any of said tagged first missing resources which are included in said missing resource List as second missing resources; and circuitry for executing a missing resource options procedure on missing resources in said updated missing resource List.

10. The computer system of claim 9, wherein said sub-system is a logical partition (LPAR) of a said system.

11. The computer system of claim 10, wherein said missing resources are tagged in response to reassignment from a first one of said LPARs of said system to a second one of said LPARs of said system.

12. The computer system of claim 9, wherein one of said first missing resources of said system is a device coupled to said I/O adapter.

13. The computer system of claim 9, wherein said configuration database is a configuration database for a logical partition (LPAR) within said system.

14. A method for managing dynamic resource reassignment within a system comprising the steps of:

determining first missing resources that are missing because of reassignment within said system;

updating a missing resource List by deleting any of said first missing resources which are included in said missing resource List;

generating said missing resource List by querying a configuration database in said system for resources identified as missing resources and adding said missing resources to said missing resource List; and executing a missing resource options procedure on said missing resources in said updated missing resource List.

15. The method of claim 14 where in said determining step comprises:

tagging said first missing resources in a system error log which are missing because of reassignment.

16. The method of claim 15 further comprising the steps of:

generating said missing resource List by querying a configuration database in said system for resources identified as missing resources and adding said missing resources to said missing resource List; and executing a missing resource options procedure on said missing resources in said updated missing resource List.

17. The method of claim 15, wherein said missing resources are tagged in response to reassignment from a first one of said LPARS of said system to a second one of said LPARs of said system.

18. The method of claim 14, wherein said dynamic resource reassignment occurs between logical partitions (LPARs) of said system.

19. The method of claim 14, wherein said configuration database is a configuration database for a logical partition (LPAR) within said system.

20. A computer program product for managing dynamic resource reassignment within the system, said computer program product embodied in a machine readable medium, including programming for a processor said computer program comprising a program of instructions for performing the program steps of:

determining first missing resources that are missing because of reassignment within said system;

updating a missing resource List by deleting any of said first missing resources which are included in said missing resource List;

generating said missing resource List by querying a configuration database in said system for resources identified as missing resources and adding said missing resources to said missing resource List; and executing a missing resource options procedure and said missing resources in said updated missing resource List.

21. The computer program product of claim 20, where in said determining step comprises:

tagging said first missing resources in a system error log which are missing because of reassignment.

22. The computer program product of claim 21, wherein said missing resources are tagged in response to reassignment from a first one of said LPARs of said system to a second one of said LPARs of said system.

23. The computer program product of claim 20 further comprising the steps of:

generating said missing resource List by querying a configuration database in said system for resources identified as missing resources and adding said missing resources to said missing resource List; and executing a missing resource options procedure on said missing resources in said updated missing resource List.

24. The computer program product of claim 20, wherein said dynamic resource reassignment occurs between logical partitions (LPARs) of said system.

25. The computer program product of claim 20, wherein said configuration database is a configuration database for a logical partition (LPAR) within said system.

26. A computer system comprising:

a central processing unit (CPU);

a random access memory (RAM);

a read only memory (ROM);

an I/O adapter; and a bus system coupling said CPUs to said ROM, said I/O adapter, and said RAM, wherein a sub-system within said computer system further comprises:

circuitry for determining first missing resources that are missing because of reassignment within said system; and circuitry for updating a missing resource List by deleting any of said first missing resources which are included in said missing resource List;

circuitry for generating said missing resource List by querying a configuration database in said system for resources identified as missing resources and adding said missing resources to said missing resource List; and circuitry for executing a missing resource options procedure on said missing resources in said updated missing resource List.

27. The computer system of claim 26 further comprising:

circuitry for tagging said first missing resources in a system error log which are missing because of reassignment.

28. The computer system of claim 27 further comprising:

circuitry for generating said missing resource List by querying a configuration database in said system for resources identified as missing resources and adding said missing resources to said missing resource List; and circuitry for executing a missing resource options procedure on said missing resources in said updated missing resource List.

29. The computer system of claim 27, wherein said missing resources are tagged in response to reassignment from a first one of said LPARs of said system to a second one of said LPARs of said system.

30. The computer system of claim 26, wherein said dynamic resource reassignment occurs between logical partitions (LPARs) of said system.

31. The computer system of claim 26, wherein said configuration database is a configuration database for a logical partition (LPAR) within said system.

* * * * *

UNITED STATES PATENT AND TRADEMARK OFFICE
CERTIFICATE OF CORRECTION

PATENT NO.     : 6,950,832 B2                                                      Page 1 of 1
DATED          : September 27, 2005
INVENTOR(S)    : Joe N. Brown, Faisal M. Awada and Philip B. Burkes It is certified that error appears in the above-identified patent and that said Letters Patent is hereby corrected as shown below:

<u>Column 7,</u>
Line 12, replace "the" with -- a --.
Line 14, insert -- , -- after "processor" and before "said".
Line 26, replace "and" with -- on --.

<u>Column 8,</u>
Line 14, remove "and".

Signed and Sealed this

Sixteenth Day of May, 2006

JON W. DUDAS
*Director of the United States Patent and Trademark Office*